United States Patent [19]

Neubert et al.

[11] 4,122,932

[45] Oct. 31, 1978

[54] COMBINATION GRAIN DISCHARGE CHUTE CONSTRUCTION FOR DUMP WAGON

[75] Inventors: Frederic B. Neubert, Seymour, Ill.; Kenneth M. Coldren, Fort Wayne, Ind.

[73] Assignee: M & W Gear Company, Gibson City, Ill.

[21] Appl. No.: 724,603

[22] Filed: Sep. 20, 1976

[51] Int. Cl.² ............................................. B65G 11/04
[52] U.S. Cl. ................................... 193/5; 193/31 A; 222/608; 222/526
[58] Field of Search ........................ 193/14, 5, 31 A; 222/483, 608, 526

[56] References Cited

U.S. PATENT DOCUMENTS

| | | | |
|---|---|---|---|
| 777,084 | 12/1904 | Dwyer | 298/7 |
| 3,346,085 | 10/1967 | Petrich | 193/14 |
| 4,024,939 | 5/1977 | Grieshop et al. | 193/5 |

Primary Examiner—Allen N. Knowles
Assistant Examiner—Frederick R. Handren
Attorney, Agent, or Firm—Allegretti, Newitt, Witcoff & McAndrews

[57] ABSTRACT

An improved grain discharge chute for a hopper type grain wagon is attached to the wagon adjacent the side discharge door. The grain chute pivots between a side discharge position and a bottom discharge position. When in the side discharge position, the grain chute guides the grain from the hopper discharge door outwardly from the side of the wagon. The chute may be pivoted to a second position wherein grain discharged from the side door is diverted downwardly and inwardly beneath the wagon by the chute.

3 Claims, 4 Drawing Figures

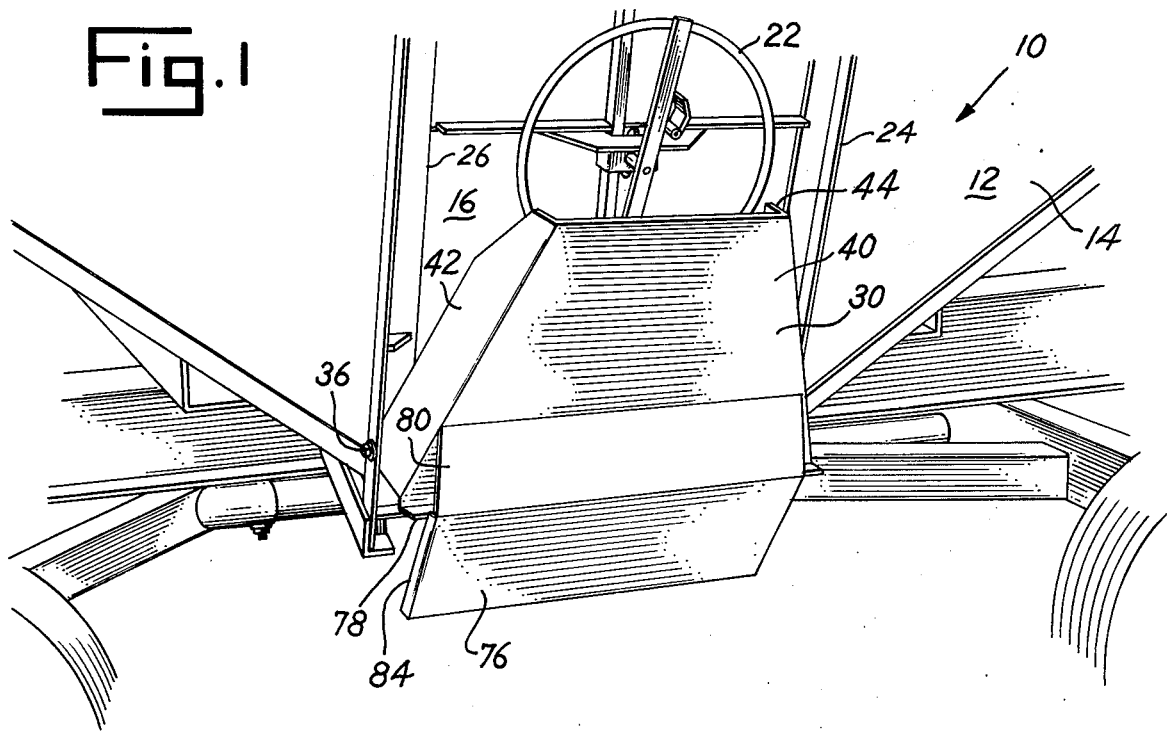
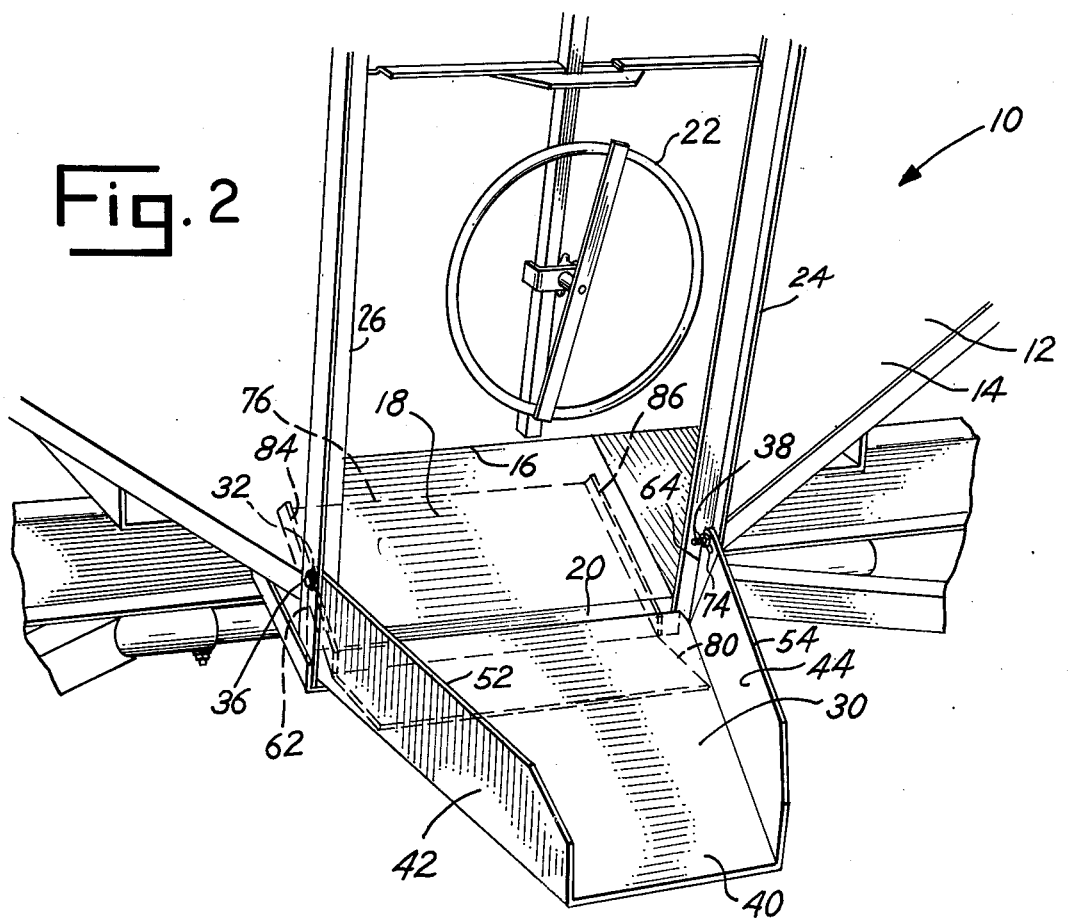

COMBINATION GRAIN DISCHARGE CHUTE CONSTRUCTION FOR DUMP WAGON

BACKGROUND OF THE INVENTION

The present invention relates to an improved chute discharge construction for a hopper-type grain wagon having a grain discharge door in the side of the wagon.

Hopper-type grain wagons for carrying grain from the field to an elevator or the like are becoming increasingly popular farm vehicles. Typically, such wagons have an inclined floor which permits opening of a side or bottom discharge door so that the grain from the wagon may be easily unloaded in an elevator or storage pit. Hopper wagons having a side discharge door often are equipped with a discharge chute or auger which facilitates withdrawal of the grain from the side door. Other wagons include a bottom discharge door which permits the grain to drop from the bottom of the wagon.

Grain discharge beneath a wagon is not generally possible with a side discharge door on the hopper wagon. Thus, special grain transfer mechanisms are often required with a side discharge door hopper wagon to enable diversion of the grain beneath the wagon. The present invention permits side and bottom discharge of grain from a side door wagon and thus constitutes an improvement over known grain discharge constructions for side door hopper wagons.

SUMMARY OF THE INVENTION

The present invention comprises an improved discharge construction for a hopper-type wagon of the type including a side discharge door. The discharge chute is attached to the side of the hopper wagon adjacent the discharge door and may be pivoted between a side discharge position and a bottom discharge position. When the chute is in the side discharge position, the bottom panel of the chute is positioned to receive material from the hopper discharge door and direct it outwardly from the side of the wagon. Pivoting the discharge chute upwardly so that the bottom panel is opposed to the discharge door positions a diverting vane or panel in the flow of material from the side discharge door. This panel diverts the material downwardly beneath the wagon.

It is thus an object of the present invention to provide a discharge chute construction for a side door hopper wagon which permits side discharge of material or bottom discharge of material from the hopper wagon.

Another object of the present invention is to provide a discharge chute construction for a side door hopper wagon which is easily manufactured and installed on existing wagons.

Still another object of the present invention is to provide an improved side discharge chute construction.

These and other objects, advantages and features of the present invention will be set forth in the detailed description which follows.

BRIEF DESCRIPTION OF THE DRAWING

In the detailed description which follows, reference will be made to the drawing comprised of the following figures:

FIG. 1 is a perspective view of the improved chute construction of the present invention in the bottom discharge position for a hopper wagon having a side discharge door;

FIG. 2 is a perspective view similar to that in FIG. 1 wherein the chute has been pivoted to the side discharge position;

DESCRIPTION OF THE PREFERRED EMBODIMENT

Figure 3:
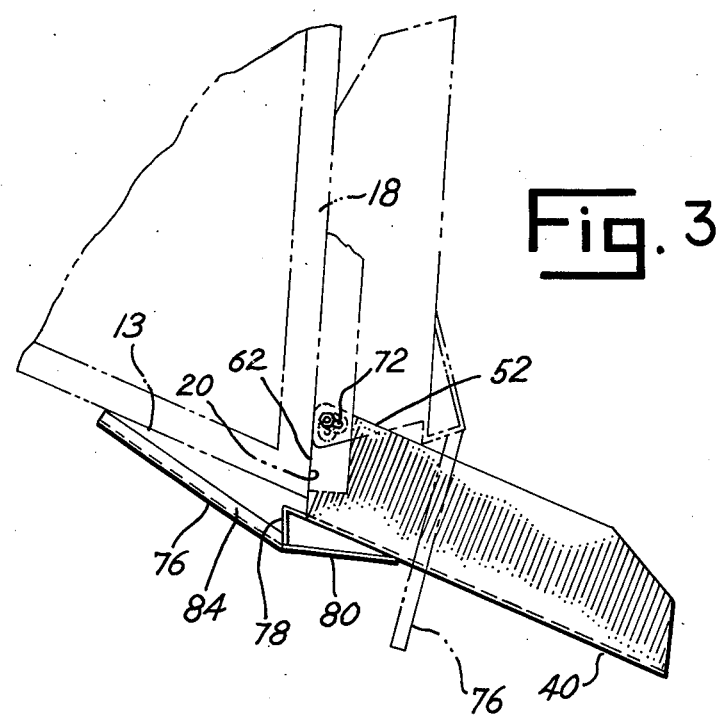
FIG. 3 is an enlarged cross-sectional view of the chute shown in FIG. 2 taken along the line 2—2 and wherein the chute illustrated in FIG. 3 is illustrated in phantom lines.

Referring to FIGS. 1 and 2, a hopper wagon 10 includes a bin or hopper 12 formed by sheet metal sides including sidewall 14. Sidewall 14 is a generally vertical wall which includes a movable panel door 16 which covers a discharge opening 18 having a lower edge 20. A control wheel 22 may be rotated to open door 16, thereby permitting grain or other material within the wagon 10 to flow through the discharge opening 18. The structure so far described constitutes a typical side discharge hopper wagon and is known to those skilled in the art.

Arranged on opposite sides of the door 16 are opposed substantially parallel vertical support brackets 24 and 26. Brackets 24 and 26 define a horizontal pivot axis for the discharge chute 30. Thus, brackets 24 and 26 include opposed spaced openings 32 and 34 as shown in FIG. 4 through which pivot bolts 36 and 38 respectively are inserted.

The discharge chute 30 is attached to the sidewall 14 by means of bolts 36 and 38 in a manner which permits the chute 30 to pivot about the horizontal axis defined by the bolts 36 and 38. The structure of the chute 30, which is discussed in greater detail below, permits side discharge of material through door 16, or alternatively permits bottom discharge of material exiting through the side door 16. Thus, material may ultimately be directed by the chute 30 to a position beneath the hopper wagon 10. As a result, it is unnecessary to construct a special hopper door in the bottom of the hopper wagon 10. Both the side discharge and bottom discharge of material can be effected using a single side door 16 in combination with the improved discharge chute 30.

Figure 4:
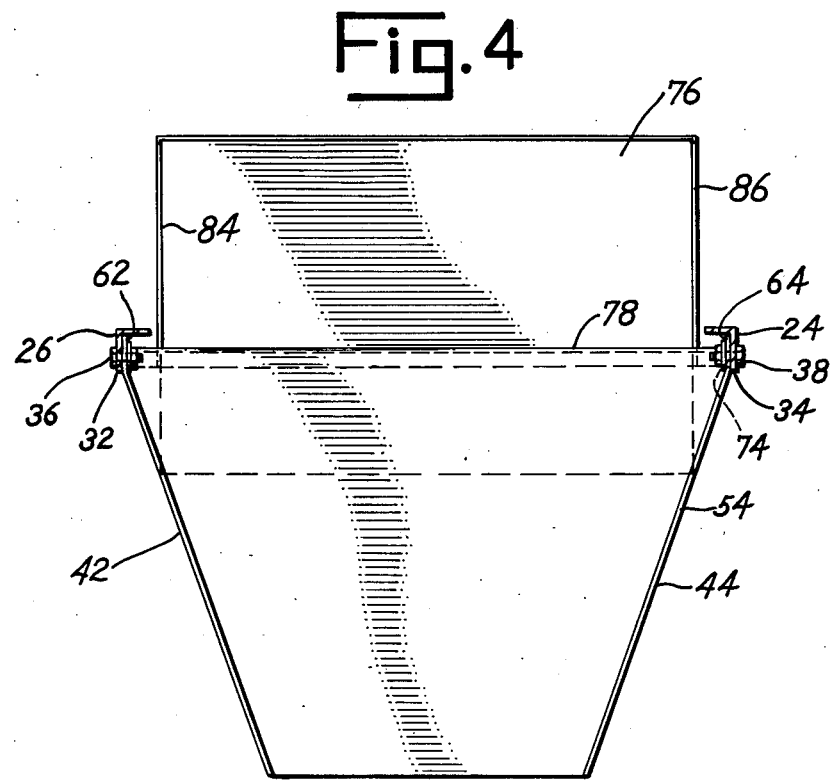
FIG. 4 is a plan view of the chute shown in FIG. 3.

FIGS. 3 and 4 illustrate in greater detail the construction of the chute 30. The chute 30 includes an outwardly extending section comprised of a bottom panel 40 and a pair of generally opposed upstanding side flanges 42 and 44 which are generally perpendicular to the bottom panel 40. The bottom panel 40 extends beneath the lower edge 20 between brackets 24 and 26. Thus, bottom panel 40 extends beyond the width of the door 16 as illustrated in FIG. 4. The bottom panel 40 converges from the door as illustrated.

The side flanges 42 and 44 include top edges 52 and 54 respectively and rear edges 62 and 64 respectively. A slot 72 in flange 42 receives bolt 36. In a similar fashion, slot 74 in flange 44 receives bolt 38. Slots 72 and 74 serve as pivot connections in cooperation with bolts 36 and 38 respectively. The rear edges 62 and 64 of flanges 42 and 44 cooperate with sidewall 14 to limit the lower pivotal position of the chute construction 30.

In general, the angular relationship between edges 62 and 64 and bottom panel 40 is chosen so that the bottom panel 40 is situated at the angle of repose of the grain or other material carried by the hopper wagon 10. This angle of repose is generally the same as the angle of repose formed by the hopper 12 and more particularly the floor 13 in FIG. 3. In this manner, material which is discharged through the door 16 will continue to flow from the hopper 12 when the chute 30 is in the position shown in FIG. 2.

The chute 30 is also pivotal to a second position illustrated phantom in FIG. 3 and also illustrated in FIG. 1. When in the second position, a reverse direction or rearward panel 76 is operative. Panel 76 is a generally rectangular panel which extends in the opposite direction from panel 40.

The plane of panel 76 makes an acute angle with the plane of panel 40 with the point of intersection of panels 40, 76 being in the direction of panel 76 relative to panel 40. Thus, panel 76 is spaced a greater perpendicular distance from pivot bolts 36 and 38 than panel 40 is spaced from the same pivot bolts.

To provide for the necessary spacing, panel 40 includes an inner end 78 folded over and welded to panel 76. The outer end of panel 76 defines a bracket 80 which is formed upwardly against the panel 40 as shown in FIGS. 3 and 4.

The side edges of panel 76 are folded upward as shown in FIG. 3 to define flanges 84 and 86. The entire chute 30 is formed from sheet metal and is welded to insure rigidity. The inner panel 76 extends from edge 62 slightly more than two times the distance from the pivot bolts 36 and 38 to the panel bottom 40. This is a preferred amount of extension and insures that when the chute 30 is positioned as shown in FIG. 1, and in phantom in FIG. 3, that grain discharged through door 16 will flow beneath wagon 10. It is also noted that the edges 52 and 54 limit the amount of rotation of the chute 30 toward the position shown in FIG. 1, thereby insuring proper positioning of panel 76 to direct material beneath the wagon 10.

The positioning of the slots 72, 74 in cooperation with bolts 36, 38 and support brackets 24, 26 and the relative spacing of slots 72, 74 thus is an important feature of the invention. As a result of this feature, it is possible to pivot the chute construction 30 to the position illustrated in the figures and achieve either side discharge or bottom discharge of material from the hopper wagon 10. The pivot arrangement guarantees that no special adjustments of the chute 30 are required to achieve the desired grain discharge direction. Mere pivoting of the discharge chute 30 to either of the limiting positions provides the desired result. Of course, it is still possible to position the grain discharge chute intermediate the end positions shown in FIG. 3. The preferred positions are, however, illustrated by FIG. 3.

Thus, while in the foregoing there has been set forth a preferred embodiment of the invention, it is to be understood that the invention shall be limited only by the following claims and their equivalents.

What is claimed is:

1. In a hopper-type grain wagon which includes a side discharge door in a sidewall of the wagon, said door having a lower edge, the improvement of a dual direction chute for the side discharge door, said wagon including spaced supports on opposite sides of the hopper door defining a single horizontal pivot axis for attachment of the chute to the wagon, said chute comprising, in combination:

a bottom panel having connected spaced substantially vertical side flanges, each of said side flanges including a pivot connector for attachment with one of the pivot axis supports, each pivot connector being placed in a side flange above the panel bottom and adjacent an edge of the side flange whereby the botom panel is pivotal to a side discharge position and forms a grain slideway from the lower edge of the door, said bottom panel being pivotal to a second position opposed to and spaced from the door, and a reverse direction panel extending from said bottom panel in the opposite direction from the bottom panel and unitary therewith whereby when said chute is in the second position, the reverse direction panel directs grain discharge from the door to beneath the wagon, said reverse direction panel forming an acute angle with the bottom panel and spaced from the pivot connector a greater perpendicular distance than the bottom panel.

2. The improved device of claim 1 wherein the end edge of each side flange adjacent the bottom panel defines a stop member engageable with the sidewall of the hopper thereby defining the angle of inclination of the bottom panel when said bottom panel is pivoted to the side discharge position.

3. The improved device of claim 2 wherein the bottom panel is maintained at the angle of repose of grain discharging from the hopper door by the flange edges.

* * * * *